United States Patent
Bergum (10) Patent No.: US 9,472,932 B2
(45) Date of Patent: Oct. 18, 2016

(54) ELECTRICAL ENCLOSURE CORD STOWAGE SYSTEM

(71) Applicant: S.J. Electro Systems, Inc., Detroit Lakes, MN (US)

(72) Inventor: Alan J. Bergum, Detroit Lakes, MN (US)

(73) Assignee: S.J. Electro Systems, Inc., Detroit Lakes, MN (US)

( * ) Notice: Subject to any disclaimer, the term of this patent is extended or adjusted under 35 U.S.C. 154(b) by 50 days.

(21) Appl. No.: 14/523,088

(22) Filed: Oct. 24, 2014

(65) Prior Publication Data
US 2016/0118778 A1    Apr. 28, 2016

(51) Int. Cl.
*H02G 3/04* (2006.01)

(52) U.S. Cl.
CPC .................. *H02G 3/0493* (2013.01)

(58) Field of Classification Search
USPC .......................................... 174/50
See application file for complete search history.

(56) References Cited

U.S. PATENT DOCUMENTS

| | | | | |
|---|---|---|---|---|
| 3,895,179 A * | 7/1975 | Wyatt | ...................... | H02B 1/50 174/50 |
| 5,276,279 A * | 1/1994 | Brownlie | ................. | H02G 3/10 174/50 |
| 5,663,525 A * | 9/1997 | Newman | ................ | H02B 1/305 174/50 |
| 6,291,767 B1 * | 9/2001 | Beecher, II | ............ | H02G 3/185 174/50 |

OTHER PUBLICATIONS

"EZ Series Plugger Panel and Simplex Panel," SJE-Rhombus®, 2 pages (© SJE-Rhombus Feb. 2010).
"Observer 100" Series Pedestal Alarm, SPI Septic Products, Inc., 2 pages.
"Sales Sheets," SPI Septic Products, Inc., 2 pages, http://www.septicproducts.com/sales-sheets.
"PS Patrol™ system with 230V Pump & 120V Alarm Installation Instructions," SJE-Rhombus® Controls, 4 pages.
"New Options—Pump Station Connection Centers," Alderon™ Industries, 2 pages.
"POWERPOST™ 4X Installation Instructions," Alderon Industries, LLC, 1 page, Oct. 1, 2004.
"Exterior Pump Controls w/ Exterior Alarms: Jiffy Junction®," Septronics Inc., 2 pages, http://products.septronicsinc.com/viewitems/pumps-alarm-controls/or-pump-controls-w-exterior-alarms-jiffy-junction-?.
Item # 3006, 120V Terminal Board w/ Event Counter, Septronics Inc., 1 page, http://products.septronicsinc.com/item/all-categories/-build-your-own-parts-accessories-2/item-1141?plpver=10&categid=100&prodid=1025&origin=keyword.
"EZ Series Plugger Panel and Simplex Panel," SJE-Rhombus®, (© SJE-Rhombus, Feb. 2010), 2 pages.
"Observer 100" Series Pedestal Alarm, SPI Septic Products, Inc., (Known of Prior to the Filing Date), 2 pages.

(Continued)

*Primary Examiner* — Dhirubhai R Patel
(74) *Attorney, Agent, or Firm* — Dicke, Billig & Czaja, PLLC (57) ABSTRACT

An electrical enclosure cord stowage system for effectively stowing a cable within an electrical enclosure. The electrical enclosure cord stowage system generally includes a base adapted to support at least one electrical component, a cover adapted to selectively enclose the at least one electrical component with respect to the base, and a receiver opening within the base, wherein the receiver opening is adapted to receive at least a portion of a power cable and/or power connector.

20 Claims, 12 Drawing Sheets

(56) References Cited

OTHER PUBLICATIONS

"Sales Sheets," SPI Septic Products, Inc., downloaded on Mar. 16, 2015 from http://www.septicproducts.com/sales-sheets (Known of Prior to the Filing Date), 2 pages.

"PS Patrol™ system with 230V Pump & 120V Alarm Installation Instructions," Aug. 2002, 4 pages.

"New Options—Pump Station Connection Centers," Alderon™ Industries, (Known of Prior to the Filing Date), 2 pages.

"POWERPOST™ 4X Installation Instructions," Alderon Industries, LLC, Oct. 1, 2004, 1 page.

"Exterior Pump Controls w/ Exterior Alarms: Jiffy Junction®," Septronics Inc., downloaded on Mar. 16, 2015 from: http://products.septronicsinc.com/printitems/pumps-alarm-controls/or-pump-controls-w-exterior-alarms-jiffy-junction-?, (Known of Prior to the Filing Date), 2 pages.

Item # 3006, 120V Terminal Board w/ Event Counter, Septronics Inc., downloaded on Mar. 16, 2015 from: http://products.septronicsinc.com/printitem/all-categories/-build-your-own-parts-accessories . . . , (Known of Prior to the Filing Date), 1 page.

\* cited by examiner

ELECTRICAL ENCLOSURE CORD STOWAGE SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to an electrical enclosure and more specifically it relates to an electrical enclosure cord stowage system for effectively stowing a cable within an electrical enclosure.

2. Description of the Related Art

Any discussion of the related art throughout the specification should in no way be considered as an admission that such related art is widely known or forms part of common general knowledge in the field.

Electrical enclosures are utilized to house and protect electrical devices such as control units, switches, gauges, alarms, sensors, displays and the like. Electrical enclosures are utilized in various industries such as for alarms for pump switches. Electrical enclosures utilized outside of a building structure typically are mounted upon a pedestal or other structure to keep the electrical enclosure along with the electronics inside above the ground surface. Conventional electrical enclosures have a lower mounting structure that allows for mounting of the electrical enclosure to a pedestal.

One problem with conventional electrical enclosures is that there is no location to stow cable to provide more room inside the main cavity of the electrical enclosure thereby making it difficult for individuals to access components within the electrical enclosure. Another problem with conventional electrical enclosures is that the power cables within the enclosure can damage electrical components within by the power cables pressing against them during installation. The potential for damage to the electrical components within an electrical enclosure increases when bulky and rigid three plug assemblies are used for the power cords. Another problem with conventional electrical enclosures is that electrical power plugs may become disconnected when the cover is attached to the base. Another potential problem with conventional electrical enclosures is that humidity can potentially condense upon a power cable to eventually enter an electrical power plug and socket resulting in a short circuit or corrosion thereof.

Because of the inherent problems with the related art, there is a need for a new and improved electrical enclosure cord stowage system for effectively stowing a cable within an electrical enclosure.

BRIEF SUMMARY OF THE INVENTION

The invention generally relates to an electrical enclosure which includes a base adapted to support at least one electrical component, a cover adapted to selectively enclose the at least one electrical component with respect to the base, and a receiver opening within the base, wherein the receiver opening is adapted to receive at least a portion of a power cable and/or power connector.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview.

Turning now descriptively to the drawings, in which similar reference characters denote similar elements throughout the several views, FIGS. 1 through 12 illustrate an electrical enclosure cord stowage system, which comprises a base 30 adapted to support at least one electrical component, a cover 20 adapted to selectively enclose the at least one electrical component with respect to the base 30, and a receiver opening 35 within the base 30, wherein the receiver opening 35 is adapted to receive at least a portion of a power cable and/or power connector.

B. Electrical Enclosure.

Figure 1:
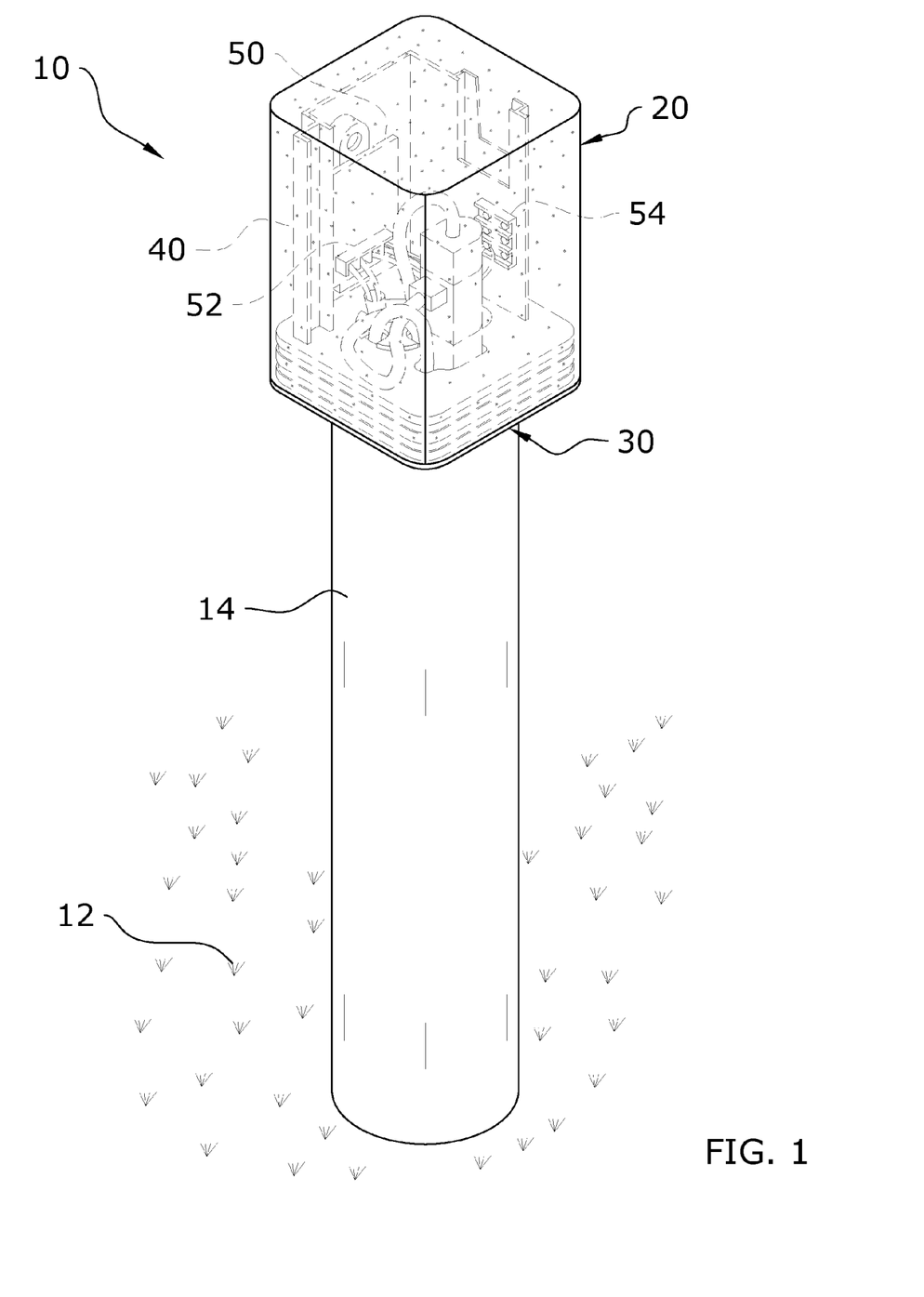
FIG. 1 is an upper perspective view of the present invention with a cover attached and the base attached to a pedestal.
Figure 5:
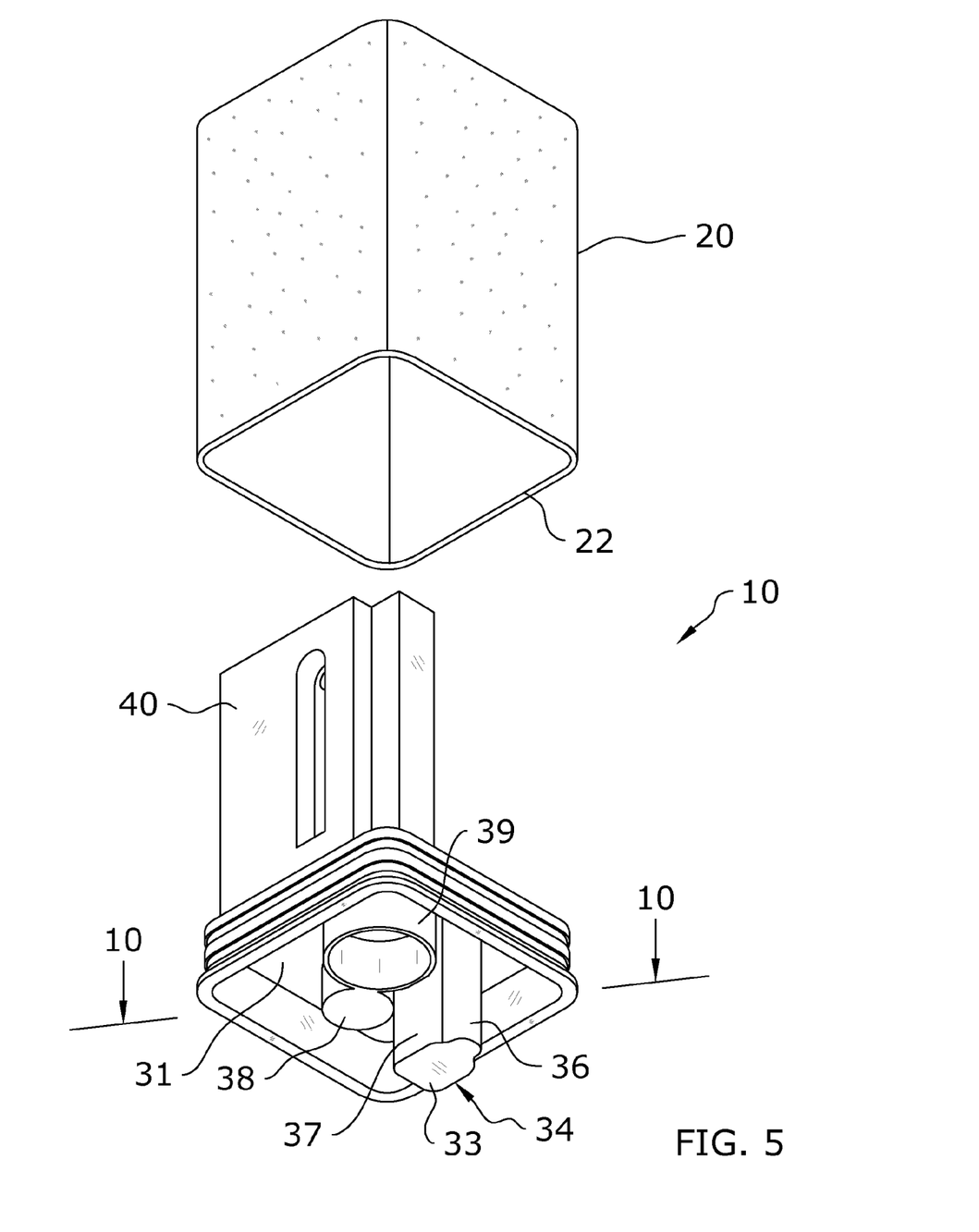
FIG. 5 is a lower perspective view of the present invention.

The electrical enclosure 10 is comprised of a cover 20 and a base 30 to protect at least one electrical component as illustrated in FIGS. 1 and 5 of the drawings. The cover 20 may be removably attached to the base 30 to allow for complete removal of the cover 20 or the cover 20 may be movably attached to the base 30 (e.g. pivotally attached) to allow for selective opening and closing of the main interior of the electrical enclosure 10.

The base 30 may be attached to the side of a wall or other structures with conventional fasteners. Alternatively, the base 30 may be attached to a pedestal 14 that extends into a ground surface 12 as illustrated in FIG. 1 of the drawings. The pedestal 14 may be comprised of various types of structures such as a PVC tube having a circular or rectangular cross sectional area.

The electrical enclosure 10 is adapted to house and protect one or more electrical components within the electrical enclosure 10. The electrical enclosure 10 may be utilized to house and protect electrical devices such as a control units 50, electrical connectors 52, terminal strips 54, switches, gauges, alarms, sensors, displays and the like in various industries such as alarms for pump switches. The electrical enclosure 10 of the present invention is preferably designed to be positioned outside of a building structure where the electrical enclosure 10 is subject to the weather such as rain, snow, sun and wind. It is therefore important that the electrical enclosure 10 be mounted upon a pedestal 14 to keep the electrical components inside the electrical enclosure 10 above the ground surface 12 as illustrated in FIG. 1 of the drawings.

The cover 20 is adapted to selectively enclose the at least one electrical component with respect to the base 30. The cover 20 is preferably adapted to be completely removed from the base 30 as illustrated in FIGS. 1 and 5 of the drawings. However, the cover 20 may also be constructed and connected to the base 30 so that the cover 20 has a closed state to substantially enclose the electrical components within a main interior of the electrical enclosure 10 formed between the cover 20 and the base 30 thereby protecting the at least one electrical component from damage. In addition, the cover 20 may also have an open state wherein the cover 20 is moved sufficiently with respect to the base 30 to expose the electrical components (e.g. by pivoting the cover 20 away from the base 30 similar to a door and hinge structure).

The cover 20 may be comprised of various shapes and sizes, but it is preferable that the cover 20 have a lower opening 22 similar in shape and size to the base 30 to provide a snug and substantially sealed connection along the perimeter of the base 30. The cover 20 may be transparent or semi-transparent to allow for viewing of the interior of the cover 20 (to also allow for visual alarms such as lights to be used to indicate an alarm situation such as high water within a sump pit).

Figure 2:
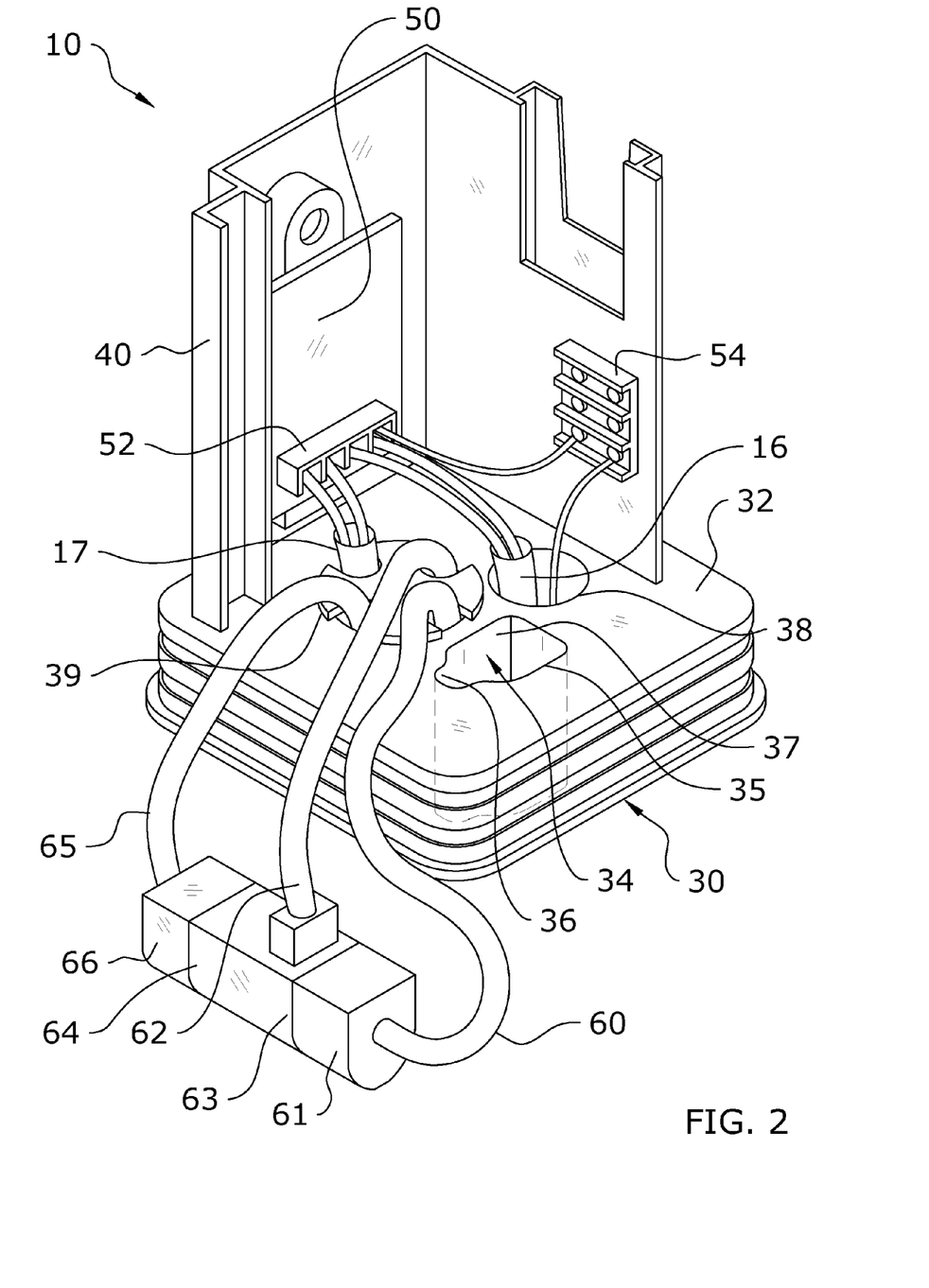
FIG. 2 is an upper perspective view of the present invention with the power cables removed from the receiver pocket and the three plug assembly connected.
Figure 3:
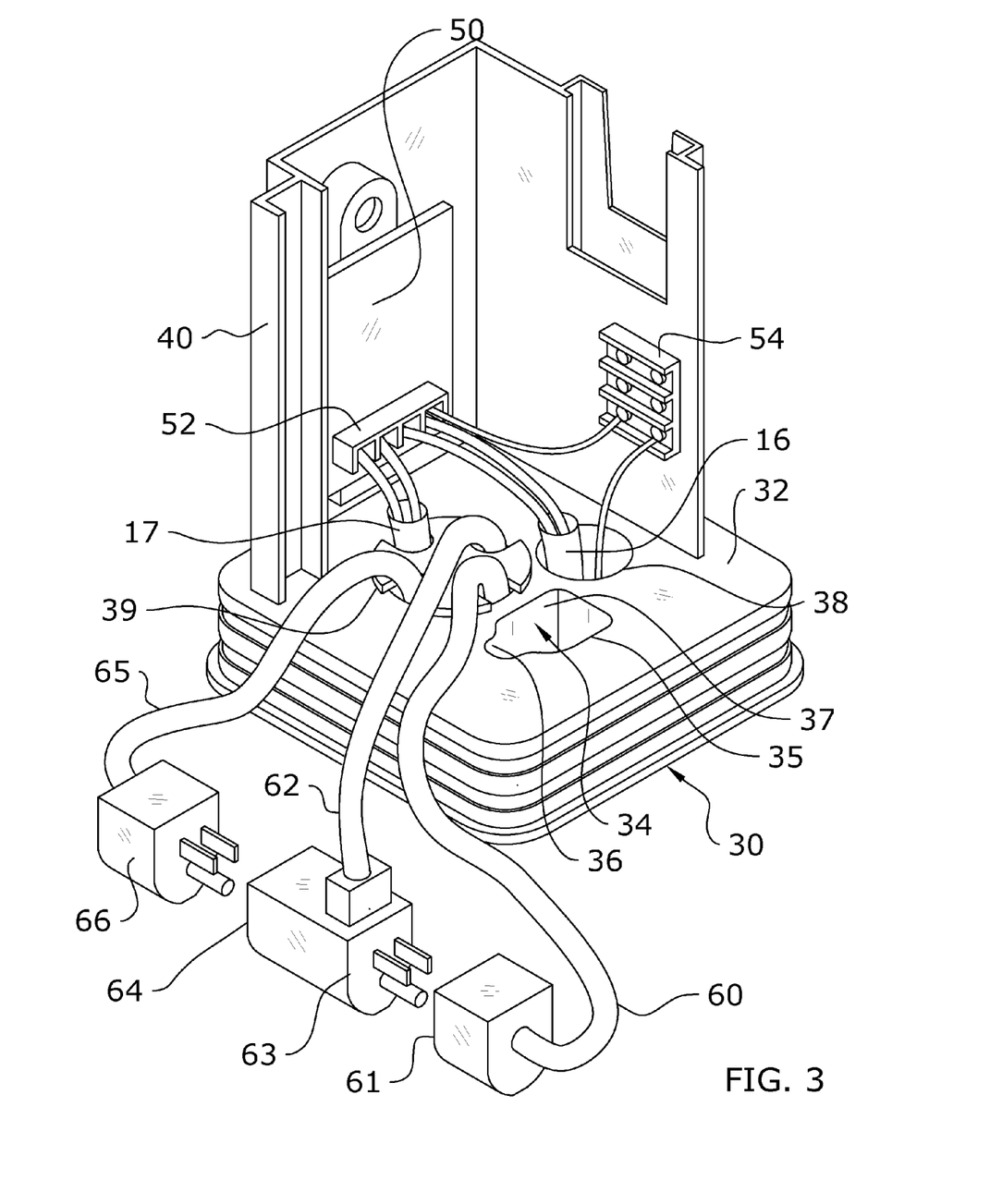
FIG. 3 is an upper perspective view of the present invention with the three plug assembly disassembled.
Figure 4:
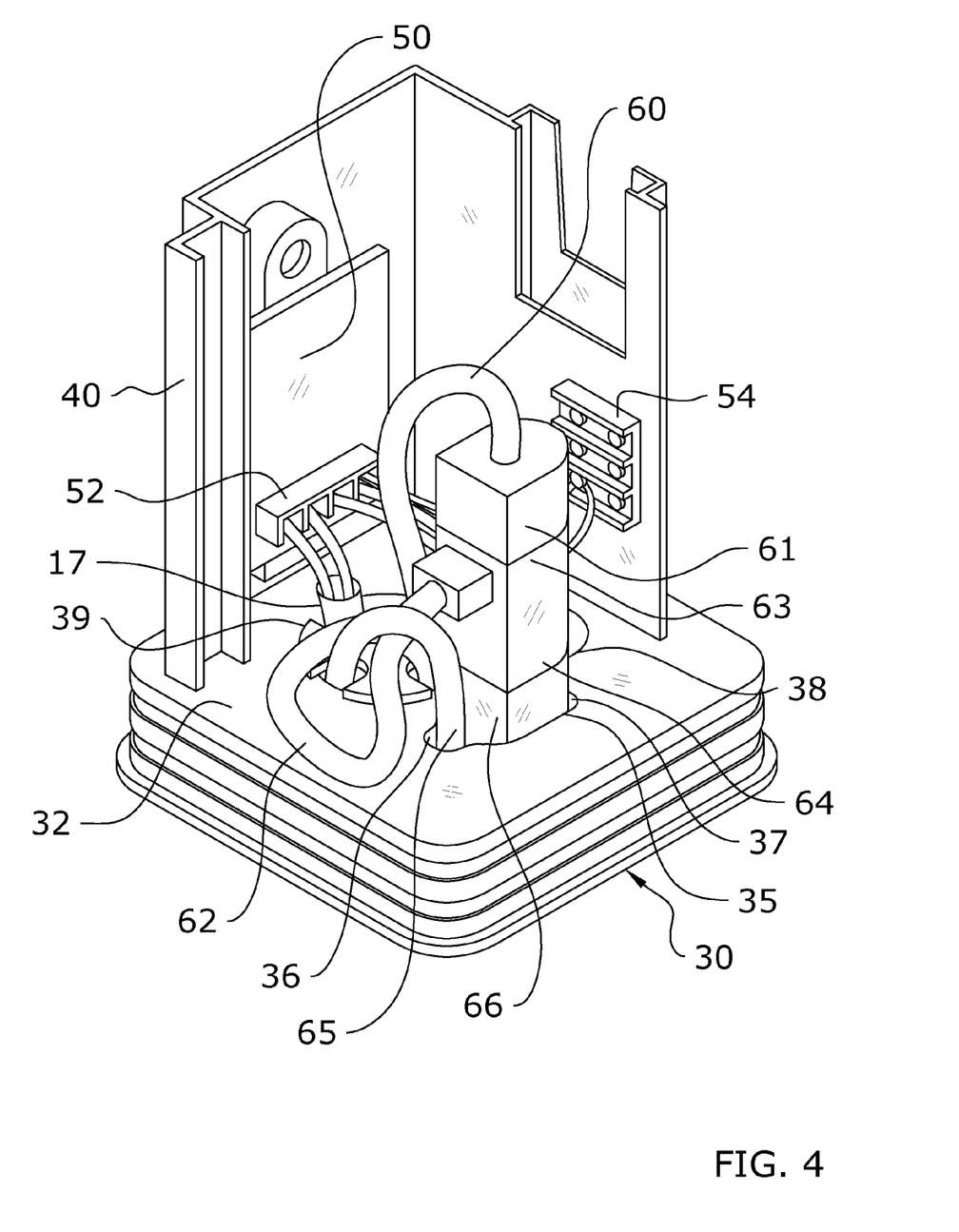
FIG. 4 is an upper perspective view of the present invention with the three plug assembly positioned within the receiver pocket.

The base 30 includes a support portion that preferably extends generally horizontally between an outer wall that defines the perimeter of the base 30 as illustrated in FIGS. 2 through 5 of the drawings. The support portion may be angled or vertically orientated. The support portion is preferably planar and forms a floor for the electronic components housed in the electrical enclosure 10 by the cover 20. The support portion has a first surface 31 and a second surface 32 opposite of the first surface 31. As illustrated in FIGS. 4 and 5 of the drawings, the first surface 31 in the embodiment illustrated is comprised of a lower surface and the second surface 32 in the embodiment illustrated is comprised of an upper surface. It can be appreciated that the first surface 31 may be comprised of an exterior surface and the second surface 32 may be comprised of an interior surface for the base 30 regardless of the orientation of the support portion.

The outer wall extends downwardly from the support portion of the base 30 to form an exterior cavity that receives the upper end of the pedestal 14. The base 30 preferably has a rectangular shape, but it can be appreciated that various other shapes may be utilized for the base 30 that are capable of receiving different shaped pedestals 14 or mounted to other structures. The base 30 further includes an electronics support 40 that extends upwardly from the support portion to support various electronic devices such as alarms (audible or visual), control units 50, electrical connectors 52, terminal strips 54, switches and the like. The outer wall further includes a flanged end at the lower distal end of the outer wall that the lower distal end of the cover 20 engages when positioned upon the base 30 as illustrated in FIG. 1 of the drawings.

The base 30 further may include a power cable recessed portion 38 for the entry of a main power cable 16 into the interior of the electrical enclosure 10. The base 30 may also include a main opening that is sealed with a cable seal unit 39, wherein the cable seal unit 39 allows for the entry of one or more cables into the interior of the electrical enclosure 10 that extend through the pedestal 14.

C. Receiver Opening.

The receiver opening 35 is positioned within the base 30 as illustrated in FIGS. 2 through 4 and 6 of the drawings. The receiver opening 35 is adapted to removably receive at least a portion of a power cable and/or removably receive at least a portion of a power connector connected to the power cable.

It is preferable that the receiver opening 35 is adapted to removably receive a multi-plug assembly such as the three plug assembly illustrated in FIGS. 2 through 4 of the drawings. The three plug assembly is comprised of a first power cable 60 having a first female connector 61, a second power cable 62 having a second female connector 64 on one side and a second male connector 63 on a second side that is removably connected to the first female connector 61, and a third power cable 65 having a third male connector 66 that is removable connected to the second female connector 64. Various other plug assemblies may be utilized within the present invention and the three plug assembly is provided as an example of one type of plug assembly the present invention is suitable for usage with.

The receiver opening 35 may have various shapes and sizes suitable for receiving at least a portion of the power cable and/or power connector. The power connector received may be a male connector or a female connector. One or more power connectors may be received within the receiver opening 35. The receiver opening 35 preferably extends completely through the support portion of the base 30 extending through the first surface 31 and the second surface 32 of the support portion of the base 30.

Figure 6:
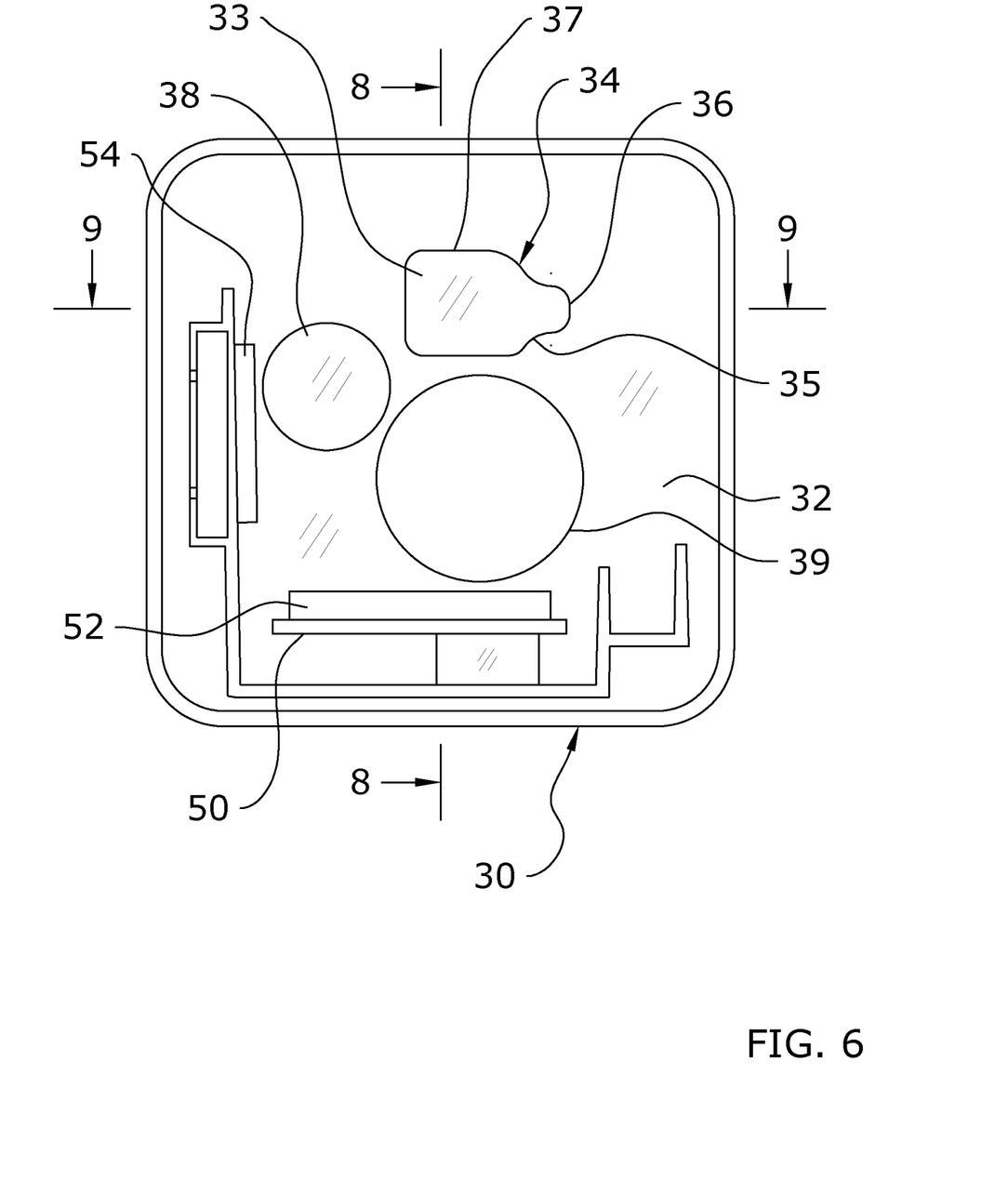
FIG. 6 is a top view of the present invention.
Figure 7:
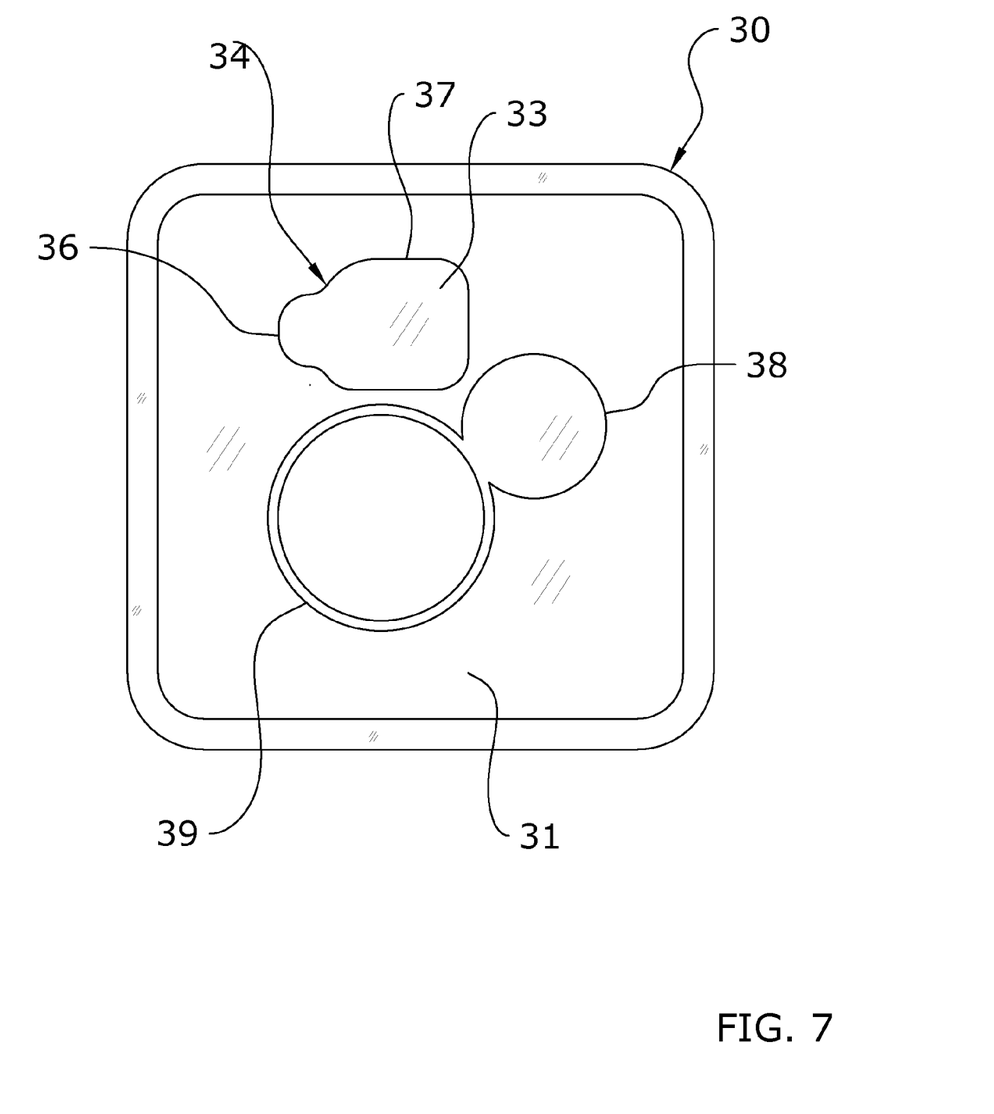
FIG. 7 is a bottom view of the present invention.
Figure 8:
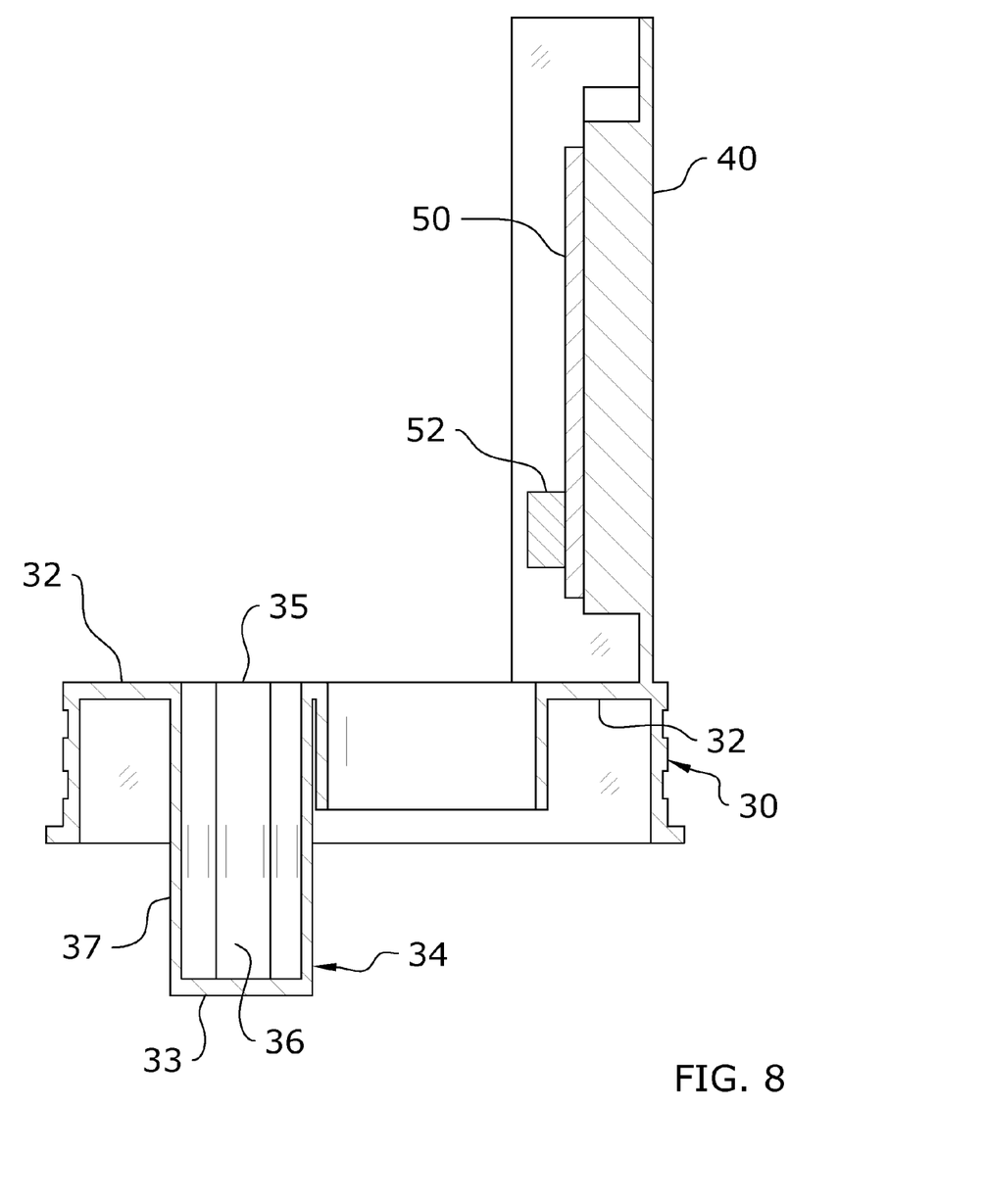
FIG. 8 is a cross sectional view taken along line 8-8 of FIG. 6.

The receiver opening 35 may be comprised of broader portion and a narrower portion having a width that is less than the broader portion as illustrated in FIG. 6 of the drawings. The broader portion is sufficient in width and length to removably receive at least one power connector and the narrower portion is sufficient in width and length to receive at least one power cable. It is preferable that the narrower portion is not capable of receiving the power connector but the present invention may be adapted so that the narrower portion is capable of receiving a power connector.

The broader portion of the receiver opening 35 has a generally rectangular shape and the narrower portion of the receiver opening 35 has a generally U-shaped configuration as further best illustrated in FIG. 6 of the drawings. The transition between the broader portion and the narrower portion of the receiver opening 35 is preferably curved on both sides though a non-curved configuration may also be used.

The receiver opening 35 may be comprised of an elongated configuration having a length that is greater than a width as further illustrated in FIG. 6. The receiver opening 35 extends downwardly through an upper surface 32 of the base 30 as illustrated in FIGS. 2 through 4 of the drawings. The receiver opening 35 is preferably positioned near a first side of the base 30 opposite of where the electrical components are attached as illustrated in FIGS. 2 through 4 and 6 of the drawings.

D. Receiver Pocket.

The base 30 further preferably includes a receiver pocket 34, wherein the receiver opening 35 is connected to a receiver interior of the receiver pocket 34 as illustrated in FIGS. 2, 3, 8 and 9 of the drawings. The receiver pocket 34 preferably has a cross sectional shape similar to a shape of the receiver opening 35, however, the receiver pocket 34 may have a different cross sectional shape. The receiver pocket 34 is preferably integrally formed within the base 30 particularly when the base 30 and the receiver pocket 34 are comprised of a plastic material. However, the receiver pocket 34 may be attached to the base 30 with a conventional fastener.

The receiver pocket 34 extends outwardly away from the interior of the electrical enclosure 10. For example, when the support portion of the base 30 is horizontally orientated, the receiver pocket 34 extends downwardly from the base 30. The receiver pocket 34 preferably extends downwardly from the base 30 below a lower surface 31 of the base 30 so that when a pedestal 14 is attached to the base 30 the receiver pocket 34 extends downwardly into the pedestal 14. The receive pocket may extend horizontally, vertically or at any angle between thereof.

Figure 9:
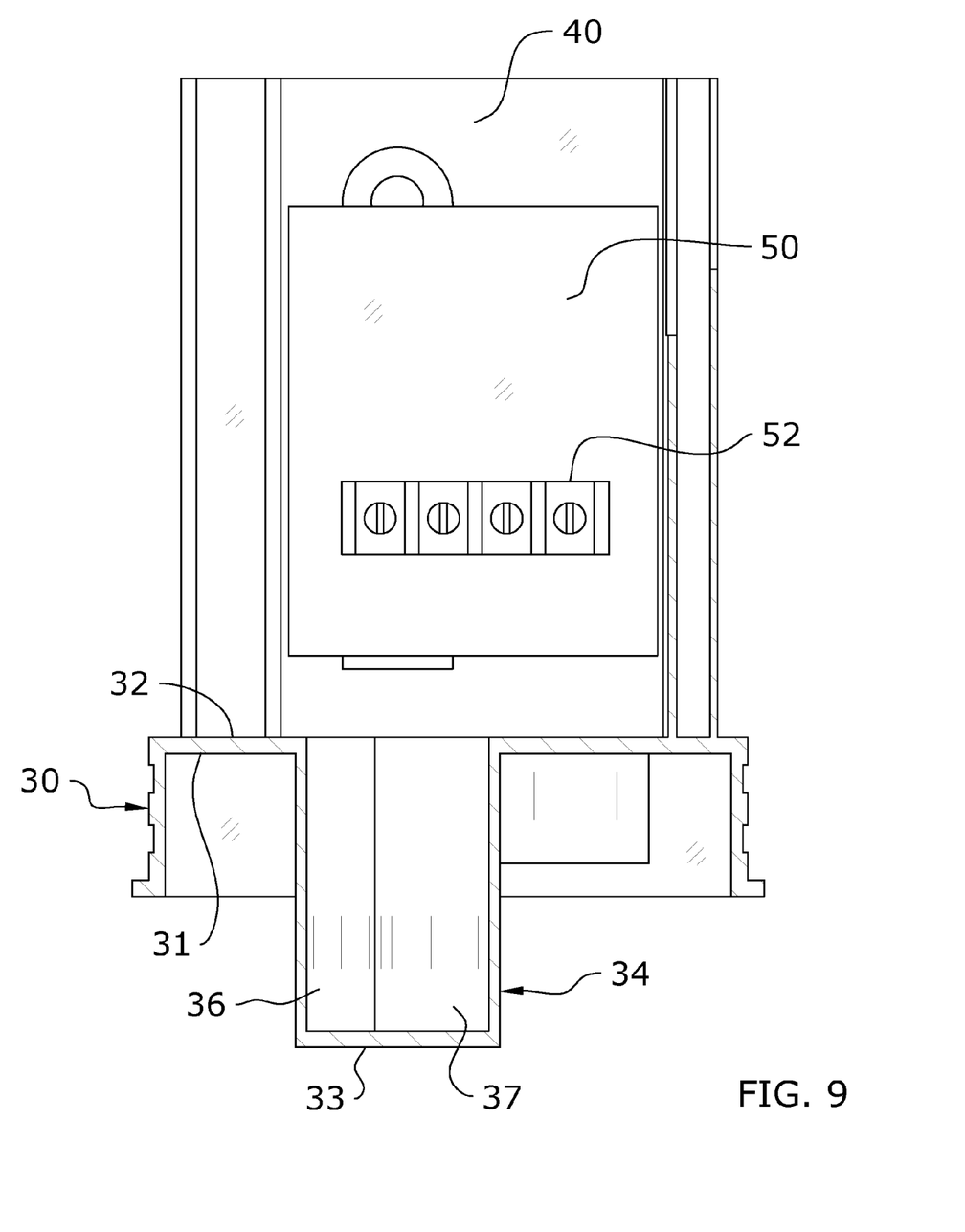
FIG. 9 is a cross sectional view taken along line 9-9 of FIG. 6.
Figure 10:
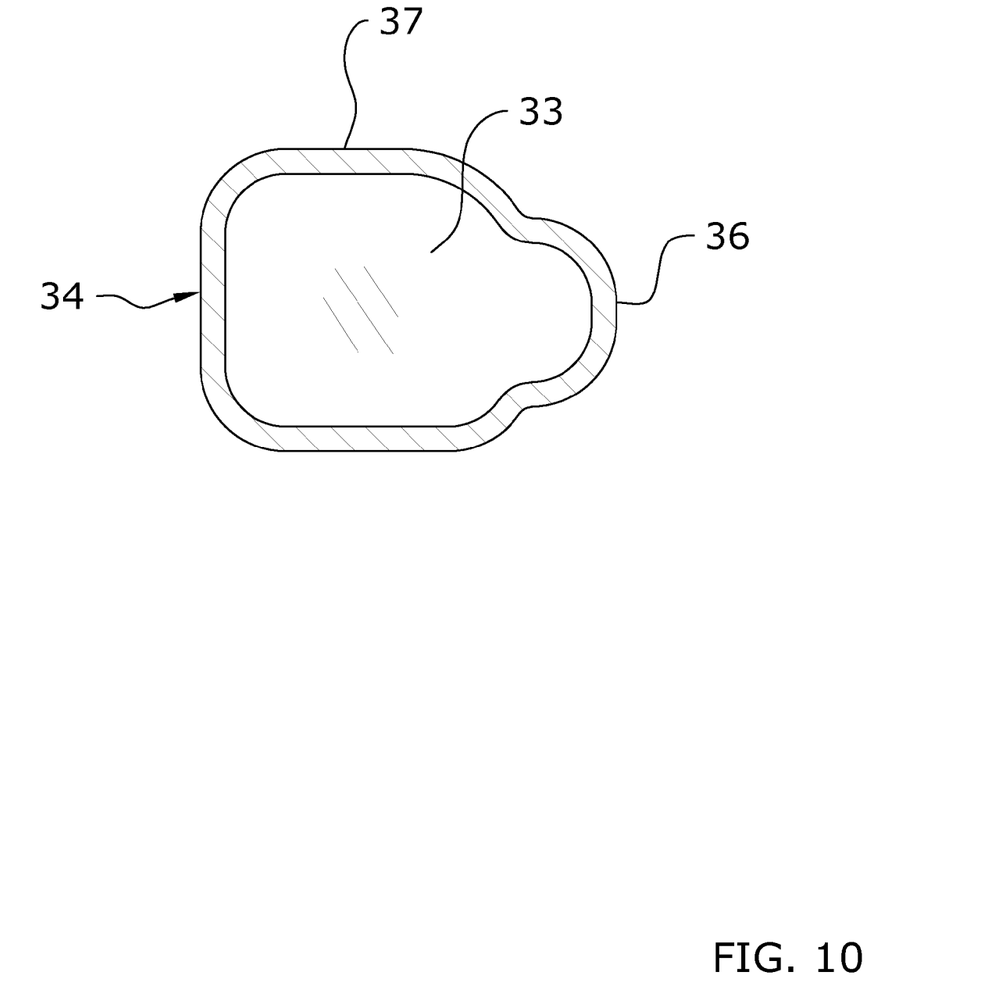
FIG. 10 is a cross sectional view taken along line 10-10 of FIG. 5.
Figure 12:
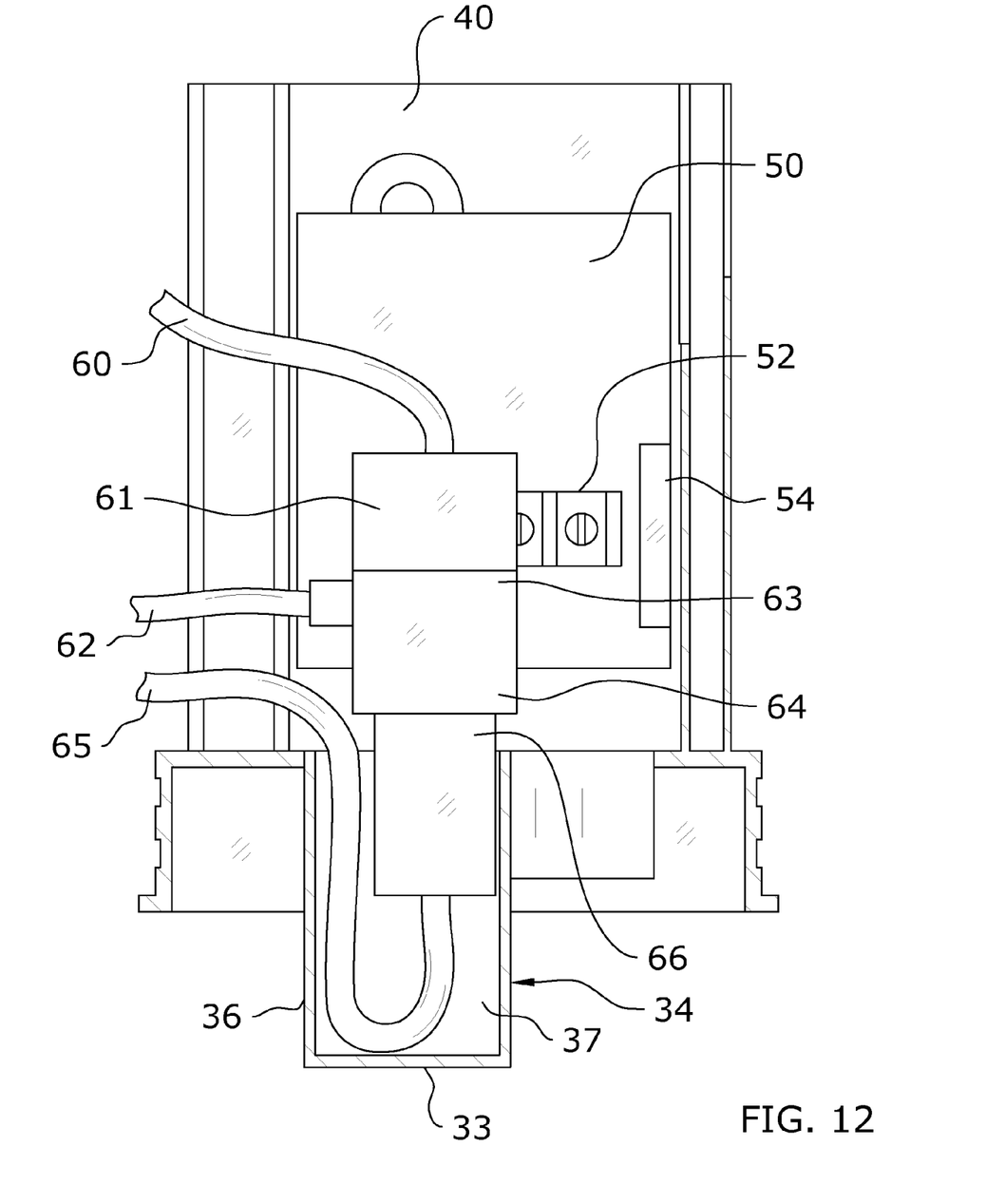
FIG. 12 is a side cutaway view of the present invention with the three plug assembly positioned within the receiver pocket.

The receiver pocket 34 is preferably comprised of an elongated tubular structure having an enclosed end 33 opposite of the receiver opening 35 as best illustrated in FIGS. 9 and 12 of the drawings. The enclosed end 33 is preferably transverse with respect to at least one sidewall of the receiver pocket 34 as further shown in FIGS. 9 and 12 of the drawings. The receiver pocket 34 is preferably comprised of a sealed tubular structure to prevent the entry of liquids or other debris into the interior of the electrical enclosure 10.

The receiver pocket 34 includes a first portion 36 and a second portion 37, wherein the first portion 36 is narrower than the second portion 37. The first portion 36 and the second portion 37 are comprised of a wall structure that forms the sidewall(s) of the receiver pocket 34. As discussed previously, the receiver opening 35 preferably has a broader portion and a narrower portion, wherein the narrower portion of the receiver opening 35 is aligned with the first portion 36 of the receiver pocket 34 and wherein the broader portion of the receiver opening 35 is aligned with the second portion 37 of the receiver pocket 34 as best illustrated in FIG. 6 of the drawings.

E. Operation of Preferred Embodiment.

In use, the base 30 of the electrical enclosure 10 is attached to a structure such as, but not limited to, a wall, post or tubular pedestal 14. The main power cable 16 is extended through the base 30 along with the other power cables 60, 62, 65. The power cables and various other electrical components are electrically connected as required for the particular application. For example, if the electrical enclosure 10 is being utilized in a float switch application, the float cable 17 is extended through the base 30 and electrically connected to the electrical connector 52 as illustrated in FIGS. 2 through 4 of the drawings. The installer electrically connects the power cables 60, 62, 65 to one another using the power connectors 61, 63, 64, 66 which may be comprised of conventional male and female connectors such as AC power plugs and sockets.

Figure 11:
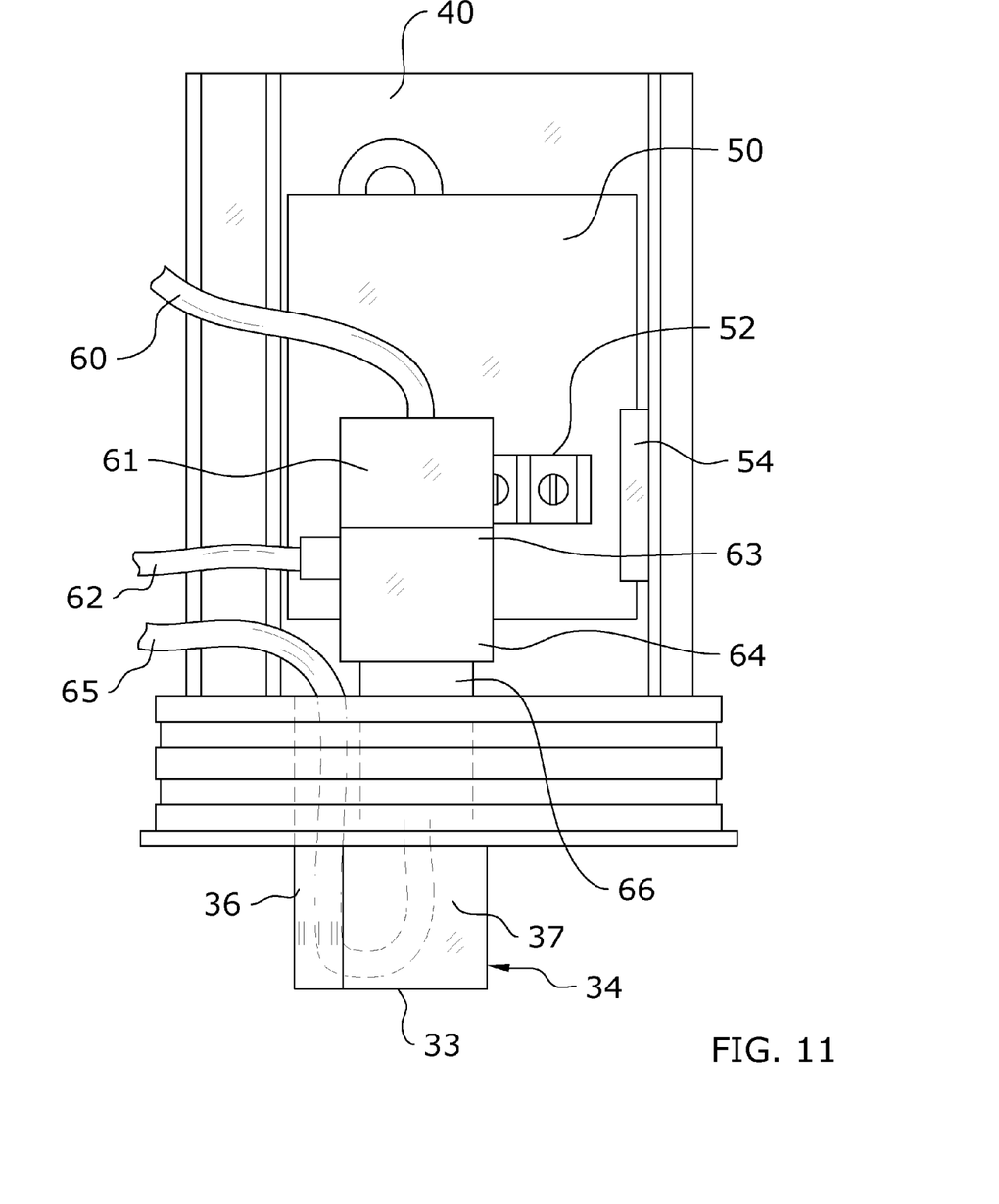
FIG. 11 is a side view of the present invention.

After the power cables 60, 62, 65 are electrically connected together forming a three plug assembly, the user then inserts at least a portion of at least one of the power cables 60, 62, 65 along with at least a portion of at least one of the power connectors 61, 63, 64, 66 through the receiver opening 35 of the base 30 and into the interior of the receiver pocket 34 as illustrated in FIGS. 4, 11 and 12 of the drawings. As shown in FIGS. 4, 11 and 12, over half of the third male connector 66 along with a portion of the third power cable 65 are positioned within the receiver pocket 34, with the third male connector 66 in the second portion 37 of the receiver pocket 34 and the third power cable 65 in the first portion 36 of the receiver pocket 34. The third power cable 65 curves upwardly after engaging the interior surface of the enclosed end 33 of the receiver pocket 34 then extends upwardly along the first portion 36 of the receiver pocket 34 away from the third male connector 66 as further shown in FIG. 12. With the three plug assembly, the respective power cables 60, 62, 65 are positioned away from the electrical components without applying pressure to the same when installed compared to a conventional installation wherein the power cables 60, 62, 65 would have been allowed to extend freely within the interior of the electrical enclosure 10.

The installer then closes the cover 20 by lowering the cover 20 upon the base 30 and then secures the cover 20 to the base 30 with a fastener or latch. With the power cables 60, 62, 65 properly positioned and maintained in a desired position because of the receiver pocket 34, the cover 20 does not force the power cables 60, 62, 65 against or closer to the electrical components within the interior of the electrical enclosure 10 thereby preventing damage to the electrical components.

In use, any water condensation upon the power cables 60, 62, 65 is allowed to drain into the interior of the receiver pocket 34 because of the vertical orientation of the three plug assembly thereby preventing contact of the electrical contact portions of the power connectors 61, 63, 64, 66 with the liquid water. If a user needs to have access to the electrical components within the electrical enclosure 10 at a later time, the cover 20 is removed or otherwise opened to provide access without the power cables 60, 62, 65 being significantly moved by the opening of the cover 20.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive.

Any headings utilized within the description are for convenience only and have no legal or limiting effect.

The invention claimed is:

1. An electrical enclosure, comprising:
   a base adapted to support at least one electrical component;
   a cover adapted to selectively enclose said at least one electrical component with respect to said base, said cover including a to and a plurality of side walls defining a cover cavity, the plurality of side walls defining a lower opening providing access to the cover cavity and adapted to receive a portion of the base; and
   a receiver opening within said base providing access to a receiver pocket, the receiver pocket comprised of a seal tubular structure to assist in preventing entry of debris into the electrical enclosure, the receiver pocket defining a receiver interior, the receiver opening and the receiver interior having a broader portion and a narrower portion, wherein said broader portion is adapted to removably receive at least a portion of a power connector and said narrower portion is adapted to removably receive at least a portion of a power cable.

2. The electrical enclosure of claim 1, wherein said cover is adapted to be completely removed from said base.

3. The electrical enclosure of claim 1, wherein said cover has a closed state wherein said at least one electrical component is substantially enclosed within an enclosure cavity formed between said cover and said base thereby protecting said at least one electrical component from damage, and wherein said cover has an open state wherein said cover is moved sufficiently with respect to said base to expose said at least one electrical component.

4. The electrical enclosure of claim 1, wherein said receiver opening is adapted to removably receive at least a portion of said power connector connected to said power cable.

5. The electrical enclosure of claim 1, wherein said receiver opening is adapted to removably receive a multi-plug assembly.

6. The electrical enclosure of claim 1, wherein said broader portion is sufficient in width and length to removably receive said power connector and wherein said narrower portion is sufficient in width and length to receive said power cable.

7. The electrical enclosure of claim 6, wherein said narrower portion is not capable of receiving said power connector.

8. The electrical enclosure of claim 1, wherein said broader portion of said receiver opening has a generally rectangular shape.

9. The electrical enclosure of claim 8, wherein said narrower portion of said receiver opening has a generally U-shaped configuration.

10. The electrical enclosure of claim 9, wherein said receiver opening is comprised of an elongated configuration having a length that is greater than a width.

11. The electrical enclosure of claim 1, wherein said receiver opening extends downwardly through an upper surface of said base.

12. The electrical enclosure of claim 1, wherein said base includes a first side and a second side, said base supporting said at least one electrical component proximate said first side, wherein said receiver opening is positioned near the second side of said base opposite first side where said at least one electrical component is to be attached.

13. The electrical enclosure of claim 1, wherein said receiver pocket is comprised of a cross sectional shape similar to a shape of said receiver opening.

14. The electrical enclosure of claim 1, wherein said receiver pocket extends downwardly from said base.

15. The electrical enclosure of claim 14, wherein said receiver pocket extends downwardly from said base below a lower surface of said base.

16. The electrical enclosure of claim 15, including a pedestal attached to said base, wherein said receiver pocket extends downwardly into said pedestal.

17. The electrical enclosure of claim 1, wherein said receiver pocket includes a first portion and a second portion, wherein said first portion is narrower than said second portion.

18. The electrical enclosure of claim 17, wherein said receiver opening is comprised of said broader portion and said narrower portion, wherein said narrower portion has a width that is less than said broader portion, wherein said narrower portion is aligned with said first portion of said receiver pocket and wherein said broader portion is aligned with said second portion of said receiver pocket.

19. The electrical enclosure of claim 1, wherein
   said base includes a flange extending outward proximate a bottom of said base,
   said cover contacts said flange proximate said lower opening.

20. The electrical enclosure of claim 1, wherein
   said receiver pocket is integral with said base.

* * * * *